March 22, 1927. 1,621,568
Z. E. VOSE
METHOD FOR MAKING CONFECTIONS
Filed April 15, 1924
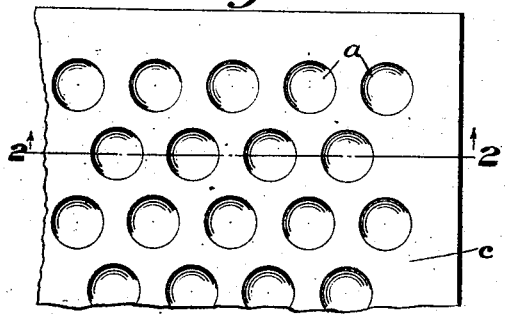
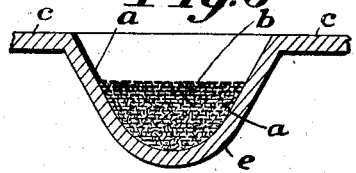
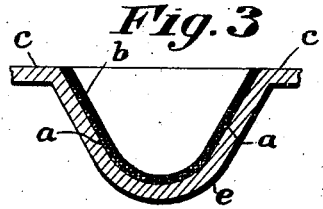
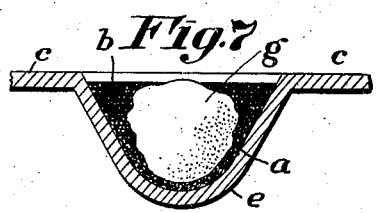
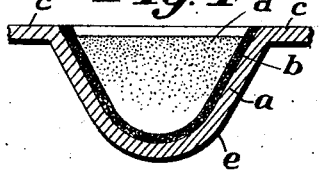
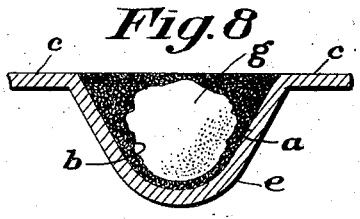
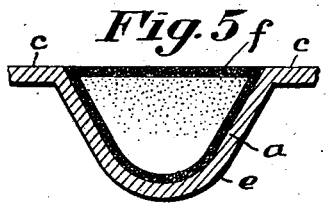
INVENTOR.

Patented Mar. 22, 1927.

1,621,568

UNITED STATES PATENT OFFICE.

ZELMAN E. VOSE, OF BOSTON, MASSACHUSETTS.

METHOD FOR MAKING CONFECTIONS.

Application filed April 15, 1924. Serial No. 706,783.

My invention relates to processes for making confections and particularly for making chocolates or similar composite confections having a core and a surrounding shell or exterior coating as hereinafter described.

In the making of chocolates the common commercial practice heretofore has been to first make a center to serve as a core for the completed confection upon which a casing of chocolate is later placed, usually by dipping. The procedure followed in making what are commonly termed cream centers is to first fill shallow trays with starch, and then to press or indent the starch, leveled off in such trays, with suitably formed patterns of the size and shape the center is desired to assume. Thus there is formed in the tray a series of indentations in which the cream or center material may be deposited while warm and in a fluid condition. Said material assumes the shape of the various indentations and the trays are taken to a cooling room where the exterior at least of the centers hardens to a sufficient extent so that the centers can be separated from the starch and coated with chocolate or other edible material and maintain their shape while the coating hardens. It is readily seen that this involves a number of operations which it is desirable to eliminate, especially the cooling of the centers which takes much time and space. At each handling of the cream or other center material there is scrap which has to be rehandled and represents a loss of time and labor as well as a net loss of some center material itself. The imperfect shapes, tails, scrap and the like also have to be recooked or otherwise used as they are not suitable for dipping. The moulds or indentations of the starch frequently break down so as not to be of the proper shape or contour. These various operations are cumbersome, and require a good deal of floor space and either expensive machinery or considerable labor which I have found are largely superfluous. After the centers are once formed and cooled, they have been, in previous commercial practice, coated with chocolate or other edible exterior either by hand or machinery and it has been necessary that the centers be sufficiently stiff or rigid to withstand the handling and temperature incident to the coating process without collapsing, and to maintain their shape throughout the various operations and until the exterior or coating congeals.

In the better grades of chocolate cream confections the practice has been to employ chemical or bacterial means as an ingredient of the center material in order ultimately to invert the sugar hardened by the cooling of the centers and cause the sugar to assume a fluid or semifluid state, i. e. become partially hydrolized, which is much desired in the trade. An acid such as tartaric acid, or an enzyme invertase, a yeast product, are used in the art for this purpose (as fully set forth in United States Patent No. 1,437,-816 to Paine and Hamilton), to change the native sugar to invert sugar at the end of three or four weeks according to the amount of such material used. The expense, trouble, and delay involved in using such chemical or bacterial means prohibits their use in the cheaper grades of cream-centered candy so that the centers in such candies harden and hence are not as well liked by consumers. Various other limitations in the manufacture of cream centers, according to present commercial practice, are also necessitated for structural reasons in order that the centers may maintain their shape.

Of course caramel or nougat centers and the like do not require means to invert the sugar as it is intended and desired that they shall be somewhat hard and remain so. Such centers are commonly, though not necessarily, formed by other than the starch moulding method employed in the manufacture of cream centers, but any mode of pre-forming centers before coating involves an equivalent amount of time and trouble.

A source of serious difficulty in the manufacture of chocolates, whether hard or cream-centered, has been the tendency of the cocoa butter or other fats in the chocolate to ooze or "bloom" from the casing or exterior and cause the chocolates to assume a grayish exterior which seriously impairs their salability. This grayness, commonly caused by dipping centers that are too warm is due to the fact that cocoa butter is oily and has a tendency to separate from the chocolate mixture and crystallize or collect just under or upon the surface of the product. This has always been regarded as a limitation in the manufacture of high grade chocolates necessitating the separate moulding or shaping, and cooling of the centers prior to dipping or coating. If such centers are too hot when they are coated, or if the chocolate itself is too hot when applied to the centers, the graying will likely take place and for this reason the temperature of the pre-formed centers has always had to be regulated at a considerable loss of time and trouble before they were coated.

This invention contemplates the combining or putting together of a warm liquid center material, or a warm solid center material, with melted chocolate in a mould, and a controlled cooling of the confection thus formed with or without additional chocolate to enclose the center material. The advantages of my methods are that chocolates of attractive appearance having a compact, homogenous, fluid, semi-fluid, or solid center, as desired, may be manufactured with a considerable economy of time, space, labor, investment for equipment and material. There is also a marked saving in the cost of artificial refrigeration.

In the drawings:

Fig. 1 is a plan view of a series of moulds, suitable for use in carrying out my invention.

Fig. 2 is a cross-sectional view on line 2—2 of Fig. 1 looking with the arrows.

Fig. 3 is a cross-sectional view of a single mould illustrating the step of coating a mould.

Fig. 4 is the same as Fig. 3 with the addition of center material deposited within the coating illustrating a later step of the process.

Fig. 5 is the same as Fig. 4 illustrating the addition of coating material covering or sealing the center as a later step of the process.

Fig. 6 is a cross-sectional view of a single mould having therein a certain amount of melted chocolate and illustrating a modified step of forming a coating.

Fig. 7 shows a mould and contents after a center has been deposited therein as a step after that illustrated in Fig. 6.

Fig. 8 illustrates the step of applying additional coating material to cover the center.

Referring to the drawings:—

Fig. 1 shows a series of moulds $a$, $a$ made as a unit though the moulds need not necessarily be in this form and obviously may be of any shape which it is desired to have the exterior of the finished confection assume.

Fig. 2 shows the moulds of Fig. 1 in cross-section and of a suitable shape for making chocolate creams or the like.

Fig. 3 shows a mould $a$ with a coating of chocolate $b$, introduced into the mould, for example, by means of brushing, spraying, dipping, or depositing.

Fig. 4 shows the mould of Fig. 3 with the center material $d$ suspended in the chocolate. It is during this step that the principal cooling and temperature control is effected, as more fully set forth hereinafter. This is preferably done by means of cold air-blast directed upon the back $e$ of the mould $a$.

Fig. 5 shows the partially completed confection of Fig. 4 with the addition of the base $f$ which is added by means of depositing additional chocolate. Any excess may be scraped away by suitable means, as by a metallic blade scraping or passing across the surfaces $c$, $c$ and scraping off the chocolate flush with those surfaces so that the completed confection having a well defined exterior can be later removed from the mould.

The invention may be practiced by employing a series of moulds, preferably of metal, such as those shown in the drawings. The thickness of the coating of chocolate which adheres to the moulds, is governed by the temperatures of the moulds, surrounding air, and that of the chocolate used. I have found that ordinarily the chocolate need not be kept at as high a temperature as is necessary for machine coating of centers (90° F. or above) and that my process may be conducted at a temperature nearer that at which chocolate congeals. Thus the danger of "blooming" due to high chocolate temperatures is eliminated. This is also important in securing a proper finish on the goods, for a coating to have the desired "snap" or brittleness must be rapidly cooled when the coating is about to set. Too great lowering of the temperature of the confection, however, is of decided disadvantage, since in case this is done, when the product is subsequently exposed to ordinary or room temperature, dew will form upon it and this causes "bloom" or discoloration, such as white streaks or dull patches on the goods. The temperature of the moulds is suitably controlled so that at first they are but slightly below the temperature at which chocolate melts. The chocolate is then placed in the moulds in any one of a number of ways, such as by brushing, spraying, dipping or depositing. The center material is then deposited within the coating which adheres to the mould, the moulds being subjected to a cooling influence preferably by means of a cold air blast (usually between 40° and 50° F.) directed against the back $e$ of the mould. Thus the center for a brief period of time is suspended or floated in melted chocolate which is maintained within a mould. It has been found that warm and liquid center material though it be of a greater specific gravity than chocolate, may be maintained in suspension and not work its way through the chocolate to the mould even when the chocolate is in a melted condition. A cream or center material may be as warm as 150°–160° F., at which temperature for example, one cream was found to have a gravity reading of about 32° Bé., and still be maintained in suspension in a melted chocolate coating material, which, for example, at 110°–112° F. had a gravity reading around 27° Bé. This result is probably due to the adherence of the chocolate to the mould, and the cooling on the back of the mould assists in keeping the chocolate somewhat more viscous and sticky. The advantages of this are many in that a rapid procedure is possible, no extremely low temperatures are necessary or desirable, the product is quickly cooled but not to too low a temperature, and as the result the composite product has an attractive finish and appearance, and is at a suitable temperature to be packed and retain its finish and appearance. As the coating cools and solidifies, the center also cools. When a warm center is deposited it is desirable that cool air come in contact with its exposed surface at the top in order to hasten the cooling, which is, however, effected principally by the conduction of its heat through the chocolate to the mould.

After the pieces have cooled somewhat the sealing chocolate or base is applied. The cooling is meanwhile continued, and it is preferable that the pieces thus completed be cooled by the blast as before mentioned so that their temperature throughout the mass of each piece is between 5° and 15° below room or normal temperature. The finished pieces may then be tapped from the moulds without injury preparatory to being packed.

My invention also contemplates the coating of various sorts of preformed solid or semi-solid centers while they are yet warm and hence unsuited for hand dipping or machine enrobing. I have found that such preformed centers, of a temperature above that at which the chocolate melts, may be coated in a mould in the same manner as the soft or liquid centers previously described, the form of the coating being maintained by the mould itself, and the condition and appearance of the coating being controlled by means of a suitable cooling influence.

The so-called hard-centered confections such as caramels, nougats, etc., can also be made without preforming the centers by simply depositing or moulding the warm center material within the coating and allowing it to be hardened there.

Figs. 6, 7 and 8 illustrate manipulations whereby the composite product may be made, if desired, without first coating the entire interior of the mould before the deposit of the center. In this case a definite amount of coating material $b$ is deposited in the mould $d$, e. g., 30%–40% of the capacity of the mould, as shown in Fig. 6. The center material is then deposited causing the surface level of the coating material to rise and envelop, to a certain extent, the center deposited therein, as shown in Fig. 7, in which the deposited center $g$ is floated or suspended in the coating material $b$, the level of which has risen about the center $g$. In this procedure, however, when fluid or semi-fluid centers of high viscosity are deposited, it is usually necessary to jolt or agitate the mould so that the center material tends to sink in the chocolate, and the latter tends to rise above the center and adhere to the sides of the mould. The cooling of the chocolate after the center is deposited is carried on as before described in connection with Figs. 4 and 5.

After the piece has partially cooled the bottom or base of the exterior may be added as above described in connection with Fig. 5. In some cases this separate step is unnecessary, especially when the mould is agitated so that the center sinks and is completely enclosed by the coating material. Fig. 8 shows the confection of Fig. 7 completed by the addition of more coating material which being warm at once joins and forms a part of the coating and makes it a complete unitary exterior surrounding the center $g$, the excess, if any, between the moulds on the flat surfaces $c$, $c$ being scraped as before described in connection with Figs. 3 to 5.

In my use of the words "chocolate", I do not intend to confine the terms solely to what is technically chocolate but intend that it shall include other analogous substances characterized by cocoa butter or other fatty substitutes. By the term "warm" I mean a temperature which is in excess of the melting point of chocolate.

By the phrase "warm center" (whether liquid or solid) in this specification and claims I mean a center, the temperature of which is 100° F. or in excess thereof, and by the phrase "melted chocolate" in the claims I mean that the coating material is in a molten or unsolidified condition.

I wish it to be understood that the examples of moulds, confections, or steps in making confections herein shown or described, are to be regarded as but illustrative of my invention and not in any way limiting the scope thereof, except as expressed in the following claims, since it is evident that various modifications will suggest themselves to persons skilled in the art.

What I wish to claim and secure by Letters Patent is:—

1. That step in the method of making a composite confection of the class described which consists in placing a warm fluid center within melted chocolate contained within a mould.

2. That step in the method of making a composite confection of the class described which consists in placing a warm center within melted chocolate contained within a mould.

3. The method of making a composite confection of the class described which consists in artificially cooling a mould containing a warm fluid center suspended in melted chocolate.

4. The method of making a composite confection of the class described which consists in artificially cooling a mould containing a warm center suspended in melted chocolate.

5. The method of making a composite confection of the class described which consists in agitating a mould containing a warm fluid center suspended in melted chocolate.

6. The method of making a composite confection of the class described which consists in agitating a mould containing a warm center suspended in melted chocolate.

7. The method of making a confection of the class described which consists in moulding a warm center in melted chocolate, and cooling the confection until the chocolate solidifies.

8. The method of making a confection of the class described which consists in moulding a warm center in melted chocolate contained within a mould, and cooling said confection by artificially cooling the back of said mould.

9. The method of making a confection of the class described which consists in depositing a warm liquid center in melted chocolate contained within a mould, and cooling the confection until the chocolate solidifies.

10. The method of making a confection of the class described which consists in confining a warm center in melted chocolate contained within a mould, and cooling said confection until the chocolate solidifies.

ZELMAN E. VOSE.